United States Patent [19]

Dobson et al.

[11] Patent Number: 5,031,452

[45] Date of Patent: Jul. 16, 1991

[54] WATER LEVEL PROBE

[75] Inventors: Andrew R. Dobson, Etobicoke; Donald A. Toon, Burlington; Douglas J. Belshaw, Georgetown, all of Canada

[73] Assignee: Solinst Canada Limited, Glen Williams, Canada

[21] Appl. No.: 483,758

[22] Filed: Feb. 23, 1990

[30] Foreign Application Priority Data

Nov. 20, 1989 [GB] United Kingdom ............... 8926223

[51] Int. Cl.$^5$ ............................................. G01F 23/04
[52] U.S. Cl. ................................. 73/304 R; 33/719; 340/620
[58] Field of Search ................. 73/304 R; 340/620; 33/716, 719, 720

[56] References Cited

U.S. PATENT DOCUMENTS

| 2,657,577 | 11/1953 | Falk | 33/720 X |
|---|---|---|---|
| 2,997,878 | 8/1961 | Graham | 33/716 X |
| 3,909,948 | 10/1975 | Markfelt | 340/620 X |
| 4,279,078 | 7/1981 | Hinshaw et al. | 33/716 |
| 4,586,033 | 4/1986 | Andrejasich | 340/620 X |
| 4,841,770 | 6/1989 | Davies | 340/620 X |

Primary Examiner—Daniel M. Yasich
Attorney, Agent, or Firm—Anthony Asquith & Co.

[57] ABSTRACT

One electrode of the probe is its tubular outer sleeve (3), and the other is its central rod (4). The insulators (9,16) separating the two are attached rigidly to the central rod, whereby the outer sleeve may slide off the probe for cleaning and servicing purposes. The outer sleeve is held in place simply by friction from the O-ring seals (12,30). When the sleeve is removed, the central rod, insulators, etc., remain as a structurally complete subassembly. Electrical contact with the outer sleeve is made through an expandable canted coil spring (20), mounted on an insulator. The central rod is formed with a massive center section (7), for weighting the probe. The probe is supported on a graduated tape (36), in which are embedded the electrical leads (38) to the probe. The leads are securely attached and sealed in place by means of heat-shrinkable material (50), which is wrapped around the leads, heat-shrunk, and compressed into a pocket (27).

9 Claims, 2 Drawing Sheets

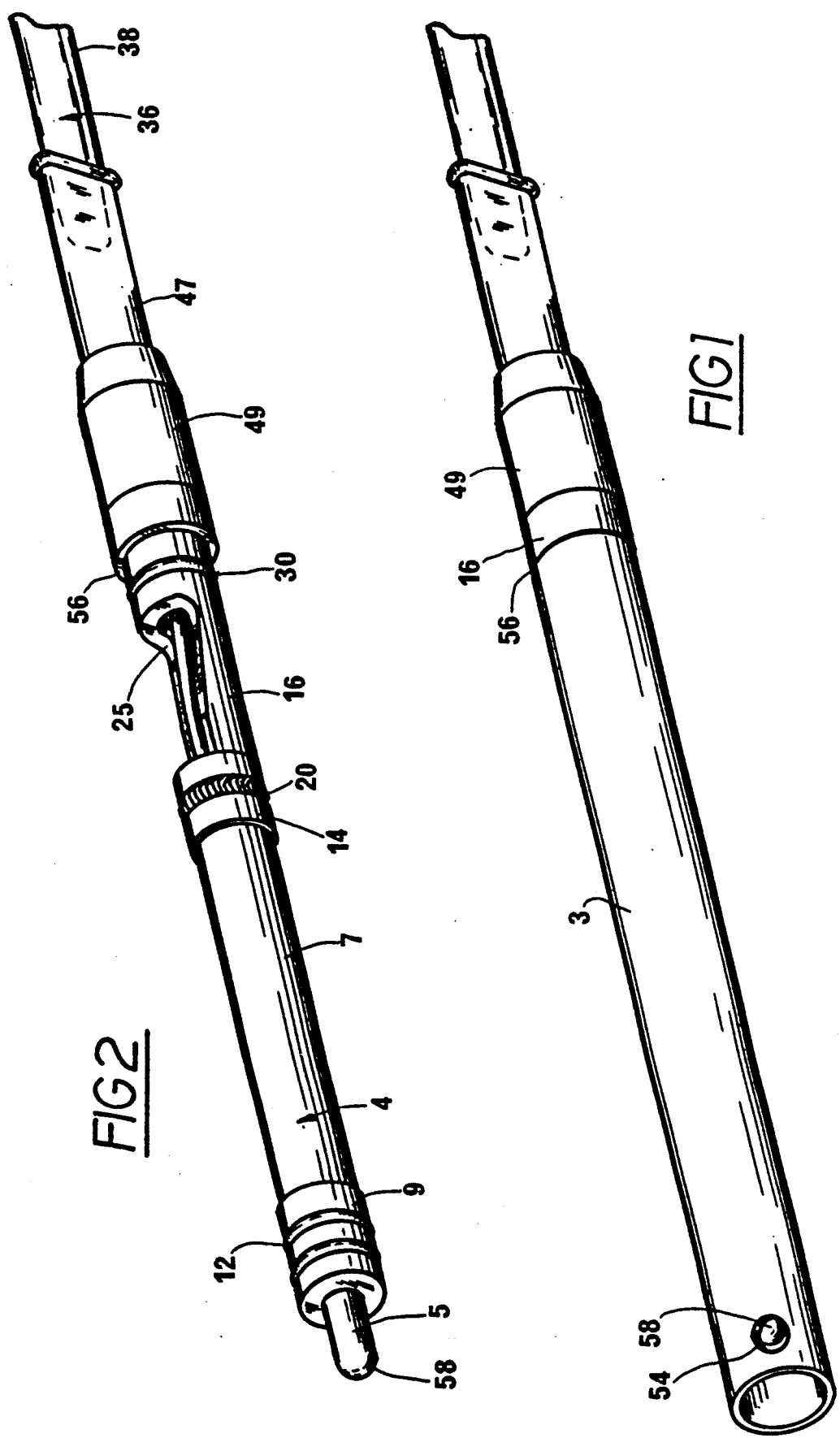

FIG 3
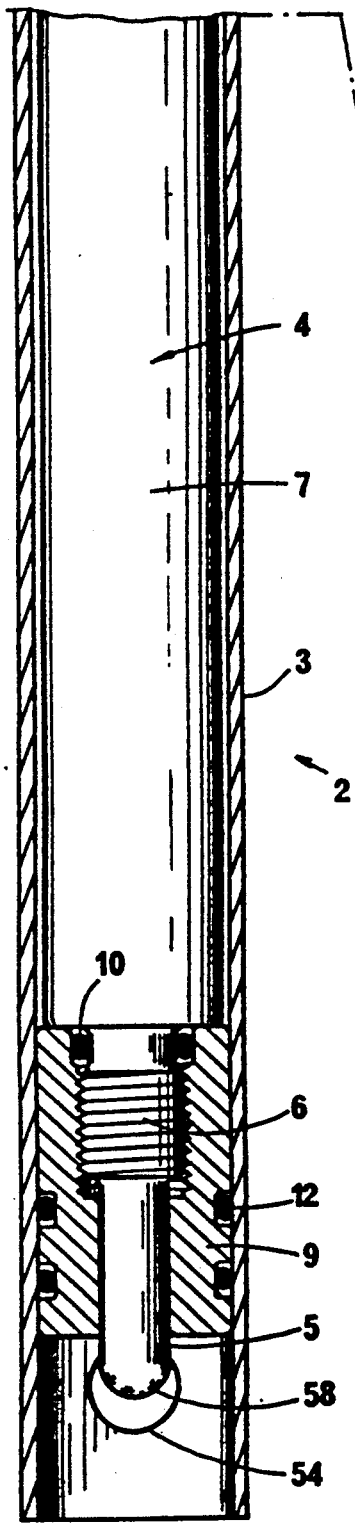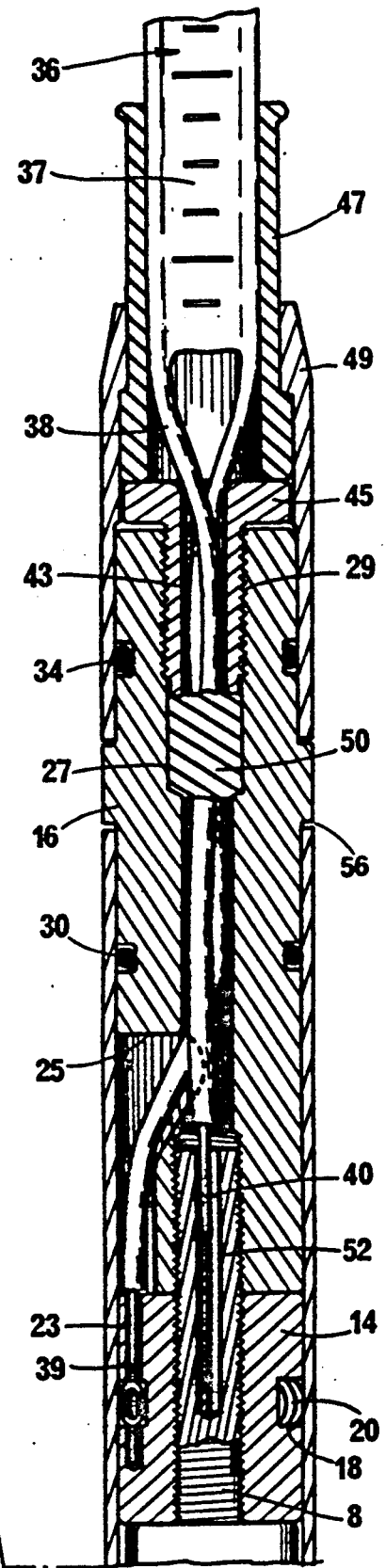

WATER LEVEL PROBE

This invention relates to a probe of the kind that is lowered into a well or other hole in the ground for the purpose of detecting a level of water.

Such a probe basically comprises a pair of electrical contacts. Electrical wires are led from the probe to the surface; when the probe comes into contact with water a current is caused to flow in a detector instrument located at the surface. The means by which the probe is suspended in the well includes a cable with a graduated scale, and the level of the water is equated to the depth reading at which the current is detected.

BACKGROUND OF THE INVENTION

Sometimes the need arises to use the probe in circumstances in which it must be guaranteed that the water in the well has not been contaminated by the probe, nor by anything that might have been carried down on the probe into the well. In this case, it is preferred that the probe be dismantled and cleaned before use, and thoroughly inspected after use. It is an aim of the invention that the acts of dismantling and assembling the probe be simple and foolproof.

One of the key benefits of this easy serviceability is that the probe of the invention is preferred in situations where the results of the measurements are to be given in evidence: it is important then for the expert to be able to testify that the probe was cleaned and de-contaminated prior to insertion in the hole, so that the tribunal may be sure that any contaminant that may have been found in the hole cannot have come from the probe.

Sometimes, the need arises to examine the probe internally, for example to determine whether the seals of the probe are leaking, which might lead to false readings, i.e. to false indications of the depth of the water level. To facilitate such examination, again it is important that the acts of dismantling and assembling the probe should be simple and foolproof.

GENERAL FEATURES OF THE INVENTION

In the invention, the probe includes a central conductor or electrode and includes also an outer sleeve, which comprises the second electrode of the probe.

The probe includes various components for insulating and supporting the electrodes, and it is a feature of the invention that these other components are structurally associated with the central electrode, which is formed as a single structural entity.

In the invention, the outer sleeve is separable from the rest of the components of the probe. When the sleeve is so separated, the other components form a sub-assembly; and it is a feature of the invention that this sub-assembly is a structurally coherent unit. The sub-assembly is a structural entity by itself, and does not need the support of the sleeve to hold it together.

In the invention, the sub-assembly comprises the central electrode (made of metal) onto which are attached, in a firm and rigid manner, the various insulators and mounting components.

Because of this mode of construction, the probe of the invention is very easy to disassemble for service. The probe may be easily dismantled by a technician, and its internal components may be inspected and repaired, as required.

It is preferred, in the invention, that the central electrode is supported in a nose insulator at its lower end, and in a plug insulator at its upper end. These two insulators should be attached firmly and rigidly to the central electrode, for example by providing screw threads between the electrode and the insulators, and by screwing the components up tight against solid shoulders. The axes of the said screw threads preferably lie on the axis of the probe.

The two insulators are hollow; the electrode has a nose the tip of which protrudes downwards from the nose insulator, and the electrical lead to the central electrode protrudes upwards through the plug insulator.

The outer surfaces of the insulators are sized to match the inside form of the sleeve. Preferably, seals are provided on the insulators, the seals being of the kind that will allow the sleeve to be slipped over them in an axial direction.

Preferably, the sleeve is held in place by virtue solely of the friction associated with the seals.

DETAILED DESCRIPTION OF PREFERRED EMBODIMENT

By way of further explanation of the invention, an exemplary embodiment of the invention will now be described with reference to the accompanying drawings, in which:

FIG. 1 is a pictoral view of the exterior of a water level probe which embodies the invention;

FIG. 2 is a view corresponding to FIG. 1, but with an outer component of the probe removed for servicing;

FIG. 3 is a cross-section of the probe of FIG. 1.

The apparatus shown in the accompanying drawings and described below are examples which embody the invention. It should be noted that the scope of the invention is defined by the accompanying claims, and not necessarily by specific features of exemplary embodiments.

The probe 2 includes a removable outer sleeve 3. The sleeve is shown present in FIG. 1, and is absent in FIG. 2, having been removed to allow the components of the probe to be cleaned, inspected, repaired, or otherwise serviced.

The probe includes a centre electrode 4. This comprises a nose 5, a nose thread 6, a weight 7, and a threaded stem 8. In the example shown, the electrode is manufactured from a single piece of stainless steel.

The probe includes a nose insulator 9, made of PTFE (e.g. Teflon (Trademark)), which is screw-threaded to the electrode 4 at the thread 6. An O-ring 10 prevents water that may be in contact with the nose 5 from entering the interior of the probe. The nose insulator 9 is provided with a pair of outer O-rings 12, which reside in suitable grooves cut in the outer surface of the insulator.

A middle insulator 14 (also of PTFE) and a plug insulator 16 are both screwed onto the stem 8. The middle insulator 14 is provided with a groove 18 in its outer surface 19. A canted coil spring is formed into a continuous ring 20, which is secured in the groove 18. The coils of the spring ring 19 protrude slightly beyond the outer surface 19 of the middle insulator 14. Four holes 23 are drilled axially into the middle insulator, such that the holes 23 intersect with the groove 18.

The plug insulator 16 is of filled nylon material and is formed with a cut-away profile 25, which intersects with a central bore 27 of the plug. Towards the upper end of the plug, the bore 27 opens into a somewhat larger diameter threaded-hole 29. The plug insulator 16 is provided with a sleeve O-ring 30 and a cap O-ring 34, which reside in suitable grooves.

A two-wire suspension/measuring cable 36 is attached to the probe 2. The cable 36 includes a plastic sheath, which has a centre portion 37 on which are marked graduations denoting the depth to which the probe has been lowered, and two electrical leads 38, inside which are contained respective wires 39, 40 (of stainless steel).

At the probe end of the cable 36, the centre position 37 is cut out. The leads 38 are brought together, and are passed together through a bore 43 formed in a packing bolt 45. The packing bolt 45 is screwed into the threaded hole 29. A strain reliever 47, of elastomeric material, and an end cap 49, of stainless steel, are also fitted over the cable 36.

The packing bolt 45 serves to clamp a compression-type seal 50. The seal 50 comprises a body of heat-shrinkable plastic material, such as cross-linked polyolefin with thick-walled polyamide adhesive (a dual walled heat shrink with inner melt).

The body of plastic at first is in the form of a sleeve or tube, which is slipped over, and encircles, the two leads 38. The nominal sizing of the body may be such that it slips easily over the two leads.

When in position, heat is applied to the body of plastic, causing it to shrink. The plastic contracts into, and fills, the space between the two leads. The outer surface of the shrunken body may be made into a cylindrical form, and this can be done by the simple expedient of rolling the body, for example between the fingers, while the body is still warm, i.e. before the body has had time to set.

When the leads 38, with the shrunken body of plastic attached, are inserted into the bore 27, and the packing bolt 45 is tightened into the hole 29, the plastic material is thereby squeezed tightly into any tiny crevices around and between the leads, sealing those crevices very effectively. Any excess plastic material is extruded into the bore 27, in which the leads themselves are a relatively loose fit.

It is intended that once the leads have been sealed into the plug insulator 16, they should not be removed for routine servicing.

It is intended, however, that the wires should be capable of being pulled out of the probe without being damaged, and the seal 50 as described permits this to happen. The fit of the heat-shrinkable plastic material to the leads 38 is so intimate that leakage is not, in substance, permitted. However, the fit is not such that a permanent adhesive bonding takes place between the seal and the leads. The heat present in the seal 50 might cause some local softening of the insulation material of the leads, and this softening is advantageous in that it can allow the seal to form an even more intimate connection with the leads, but an actual adhesive bond should be avoided.

The stem 8 of the electrode 4 is formed with a drilled hole 52, which is drilled accurately to a predetermined depth. Thus the distance between the bottom of the hole 52 and the tip of the nose 5, is precisely controlled. The insulating plastic is stripped from the end of the wire 40, which is then inserted into the hole 52, far enough that the end of the wire is pressed against the bottom of the hole 52. The wire 40 is cut to a precise length, such that when the wire is bottomed in the hole 52 the tip of the nose 5 constitutes the zero-point of the scale on the cable 36.

The other wire 39 is also stripped, and the wire is inserted through whichever of the four holes 23 happens to be in the most convenient orientation (after the insulators 14, 16 have been screwed tight onto the stem 8) and the wire 39 passes between adjacent coils in the canted coil spring ring 20. The spacing of the coils, and the rest of the component dimensions, are such that the wire 39 may be inserted freely through the hole 23, and when so inserted may be relied upon to have made a good electrical connection with the spring ring.

The two wires 39, 40 are not soldered or otherwise fixed securely. It has been found that adequate electrical integrity is achieved simply by pushing the wires into place, as described.

The benefit of the simple push fit is that if a force arises which tends to pull the cable 36 out of the probe 2, the leads will tend to break free without damaging the cable. Thus, if the probe should become snagged while down a well or other ground hole, the leads would break free: although the probe would be lost, the (more expensive) two-wire cable would be saved. In previous probes, if the end of a two-wire cable were to be damaged it was of course possible to cut off the end of the cable, and to re-use the shortened remainder: this, however, is not at all satisfactory because a zero-allowance would have to be made thereafter when taking depth measurements, for the missing length. When the wires can break free, as described, the whole cable can be re-used with a new-probe, and the zero-position is retained.

The cable is, on the other hand, retained with adequate strength to the probe: the fit of the body 50 of heat-shrinkable plastic to the leads 38 and to the bore 27 is such that normal mechanical handling and use of the probe will not cause the cable to become dislodged, even under the sort of (mild) abuse that is inevitable in instruments intended for field use. But when circumstances arise such that the cable has to be pulled so hard that something fails, the mode of failure is that the cable is separated, whole, from the probe.

With regard to the assembly of the probe 2, it may be noted that the three insulator components 9, 14, 16 all are screwed tightly and firmly to the electrode 4. The leads 38 are held tightly and firmly within the plug insulator 16. Thus, all the components of the probe, apart from the sleeve 3, together from a separate sub-assembly (i.e. the sub-assembly shown in FIG. 2) which is structurally self-supporting, as a sub-assembly. The fact that the sleeve 3 is not present does not affect the structural integrity of the sub-assembly.

The sleeve 3 may be assembled over the sub-assembly without the use of tools. The technician simply slides the sleeve onto the sub-assembly: when O-rings are encountered, the technician will feel the extra resistance, but his hand pressure is still adequate (and the O-rings may be lubricated with (distilled) water if necessary).

The sleeve also slides over the metal spring ring 20, compressing it inwards in much the same manner as it compresses the O-rings. When assembly of the sleeve has been completed, the spring ring 20 can be relied upon to have made a good electrical connection with the sleeve 3.

Similarly, for disassembly, the sleeve may be simply slid off the sub-assembly. Again, no tools are required. The sub-assembly may be gripped in the hand, using the plug insulator 16 and end cap 49 as a handle. The components of the sub-assembly are all attached tightly and firmly to each other, so that the technician may grasp the insulator and the end cap as a handle by which to manipulate the sub-assembly relative to the sleeve.

It may be noted that there are no sharp edges on the sub-assembly, which might, if present, tend to injure the technician's fingers as he pulls the sleeve off.

The sleeve 3 is formed from tube stock, in stainless steel. A cross-hole 54 is provided, near the lower end. A shoulder 56 is formed on the plug insulator 16, and the cross-hole 54 is so positioned that when the sleeve has been fully assembled to lie against the shoulder 56 the tip 58 of the nose 5 lies in the centre of the cross-hole 54.

It is not too critical that the sleeve be accurately positioned fully against the shoulder 56. If the sleeve were to be left, say, 2 mm short of the shoulder, the depth reading would not be affected, and the O-rings would still seal, and indeed the performance of the probe would hardly be affected at all. Thus, after servicing, the sleeve is simply slipped back over the sub-assembly, without particular regard for accuracy, and without any need for re-setting any critical dimensions.

It may be considered that the sleeve could be secured to the insulators 14, 16 by means of one or more screws, disposed radially. However, the sleeve should not contain any holes in the region of the sleeve which is to slide over the O-rings: the inner engagement surface of the sleeve should be smooth and unbroken, to avoid damaging the seals.

Equally, it would be disadvantageous if the design were such that an electrical connecting wires had to be attached to the sleeve during assembly: as described, the spring ring 20 causes a good connection to be made to the sleeve, automatically upon assembly.

In use, the probe is lowered into the hole. (The hole may or may not be lined with a tubular plastic or metal liner.) When water is encountered, the lower extremity of the sleeve first enters the water, and the water level rises up inside the sleeve. The water then comes into contact with the tip 58 of the nose. The rounded shape of the tip 58 is such that as the water contacts the tip, the water suddenly snaps 2 or 3 mm up the tip, as a result of the meniscus that forms due to surface tension, so that the tip is suddenly fully immersed. The signal from the probe, indicating whether water is present or absent at the tip 58, is therefore clear and well-defined. Also, there is very little hysteresis associated with the depth indication: the level at which the signal clicks on as the probe is being lowered is very nearly equal to the level at which the signal clicks off as the probe is being raised.

Once the water level has been indicated, the general rule is that the probe should be immediately withdrawn from the well. The plastic material of the cable 36 is of the kind that cannot be relied upon not to contaminate the water in the well; therefore, the probe should be lowered and withdrawn in such a manner that the technician can later testify that he did not lower the probe far enough for the plastic cable 36 to come in contact with the water. It will be noted that every item of the probe with which water could come in contact, i.e. the electrode, the nose insulator, the insulator O-rings, and the sleeve, are made of materials that are accepted by a tribunal as not contributing to water contamination, such as stainless steel, PTFE, and Viton rubber.

Sometimes, however, the probe will be used merely to indicate depths, in cases where there is no requirement that the probe cannot be fully immersed in the water. Often, the well-owner wishes to know not only the level of the water in the well but also the depth of the well. The requirement therefore exists to lower the probe right down to the bottom of the well. The point at which the cable 36 becomes slack may be taken as the depth of the well.

To cater for such use, the probe should therefore be waterproof. The probe of the invention is rendered waterproof against the ingress of water from above the probe by virtue of the seal 50. The seal 50, with care during its manufacture, can be pressure-tight at depths down to about 100 meters. It will be noted that previous ways of sealing a pair of electrical leads in a probe against such pressure have been not so effective, notwithstanding the low cost of the seal 50.

Another point as regards the manner of sealing the leads may be explained as follows. In the probe as described, the stem 8 occupies a substantial proportion of the cross-section of the probe, at least in the region of the junction between the electrode and the plug insulator. It might be considered that it would be easier to attempt to seal the two leads separately as indeed has been the case in some previous designs of probe. However, the presence of the stem 8, inside the plug, means that such separate seals would have to be placed in the annulus defined around the stem. There just is not enough room to do this, with the result that when the stem is present, as described, the designer is constrained to bring the two leads 38 together and to feed the leads through the bore 27 that is co-axial with the stem. Therefore, the seal for the leads must be so arranged as to be effective to seal the leads as they lie together side by side in the bore. The seal 50 as described is effective to do this.

If the probe as described should be fully immersed in water, either deliberately or accidentally, it can be expected that water will not leak into the interior of the probe, because of the seal 50. If the occasion arises for that same probe to be used in a critical application where it is important for the technician to testify that the probe itself cannot have contaminated a well, the easy serviceability of the probe means the probe can be cleaned and de-contaminated prior to the critical measurement.

The nose insulator 9, which will come into contact with the water in the well, is of PTFE. PTFE is dimensionally somewhat unstable, and so two O-rings 12 are provided, to give extra security. The plug insulator 16 is of nylon, which can be relied upon to retain its dimensions, and so the extra security, of two O-rings, is not required.

Upon re-assembly of the sleeve onto the probe after servicing, no adjustment or re-setting of the zero position is required. The zero-reading of the cable is set by the fit of the insulators on the electrode, and the fit of the wire 40 in the hole 52, and is not affected by the position of the sleeve.

The wire 40 is of stainless steel, which is a relatively stiff material; also the hole 52 is hardly larger in diameter than the wire: therefore, the wire will not tend to buckle in the hole, and in fact the depth of penetration of the wire into the central electrode can be controlled with good accuracy, which means that the zero-position of the cable can be accurately set with respect to the lower tip of the electrode.

In the embodiment described, the weight 7 is formed from the same piece of stainless steel as the rest of the electrode 4, which is useful in eliminating a build-up of the length-tolerances which might occur if separate components were used. Alternatively, the weight may be formed separately; the weight may be formed from a less expensive steel or other material, which is then secured to the electrode.

The weight is needed in order to ensure that the probe tends not to float on the water it encounters. In some previous designs of probe, the weight has been placed below the tip of the electrode. The weight is some several centimeters long, and, if the weight were to be positioned below the tip, a depth of water up to the length of the weight would not be detected. In the arrangement of the invention, there is no difficulty in placing the weight above the tip of the electrode.

In the design of a probe, it is preferable that water cascading in the ground hole, should that occur, does not cause a false reading. Therefore, it is preferred that the one electrode should be shielded or shrouded by the other. This preference is followed in the probe as described.

It should be noted that the servicing of the probe, as described above, is intended to be applied mainly to the O-rings and other components visible in FIG. 2. It is intended that the cap 49 be permanently attached to the plug insulator 16. The cap 49 does not contribute to supporting the weight of the probe, and in fact the strain reliever 47 preferably is somewhat loose upon the cable 36. The purpose of the strain reliever 47 is to prevent damage to the cable when the cable is coiled on a drum for storage, after use.

The probe as described is simple and easy to service. With some previous designs of probe, the probe was virtually destroyed by the act of dismantling the probe, and even when re-assembly was possible it was difficult to re-set the probe to read off to the same depths as before. Such probes were often used with dirty or contaminated seals, or even when full of water, as the technician would put off the difficult task of inspecting the interior of the probe.

We claim:

1. Liquid sensing apparatus, wherein:
   the apparatus includes two electrodes, and the apparatus is of the kind in which, when the electrodes are in the liquid, the liquid provides a conductive path between the electrodes;
   the apparatus includes an insulator means, which is effective to hold the two electrodes electrically apart during operation of the apparatus;
   one of the two electrodes, termed the central electrode, is elongate and rod-like in form; the other electrode, termed the sleeve electrode, is hollow-cylindrical, and surrounds the central electrode along its length;
   the apparatus includes a means by which the insulator means and the central electrode are attached firmly and rigidly to each other, and together form a sub-assembly;
   the sleeve electrode is mountable upon, and separable from, the sub-assembly;
   the said means by which the insulator means and the central electrode are attached to each other is such that the central electrode and the insulator means remain attached rigidly together even when the sleeve electrode is separated from the sub-assembly;
   the sleeve electrode is separable from the sub-assembly by virtue of sliding the sleeve along sub-assembly, in the direction along the length of the central electrode;
   and the sleeve electrode is mounted upon the sub-assembly, the mounting being such that the sleeve electrode remains firmly attached to the sub-assembly during normal operation of the apparatus, and also being such that a person may slide the sleeve electrode along the sub-assembly by grasping the sleeve electrode in one hand and the sub-assembly in the other hand.

2. Apparatus of claim 1, characterized in that:
   the apparatus includes an electrical lead, termed the sleeve lead, and a means for mounting the sleeve lead upon the sub-assembly, and for retaining the sleeve lead thereupon throughout normal operation of the apparatus;
   the apparatus includes a contact means for connecting the sleeve electrode electrically to the sleeve lead, when the sleeve electrode is present upon the sub-assembly;
   and the contact means is such as to permit the sleeve electrode to slide along the length of the sub-assembly.

3. Apparatus of claim 2, characterized in that the contact means includes a spring means, which presses resiliently against an inside surface of the sleeve electrode.

4. Apparatus of claim 2, characterized in that the contact means comprises a canted-coil spring ring, and the sleeve lead is secured between adjacent coils of the said spring ring.

5. Apparatus of claim 1, wherein:
   the apparatus includes at least one elastomeric seal, and the said seal resides in a seal-groove formed in the insulator means;
   the arrangement and dimensions of the seal-groove, in relation to the seal, are such that, when the seal is residing in the said seal-groove, the seal engages, with pressure, an inside surface of the sleeve electrode;
   and the said dimensions are such that the pressure of the engagement gives rise to sufficient friction as to retain the sleeve electrode in place upon the sub-assembly solely by means of the said friction, without the use of fasteners.

6. Liquid sensing apparatus, wherein:
   the apparatus includes two electrodes, and the apparatus is of the kind in which, when the electrodes are in the liquid, the liquid provides a conductive path between the electrodes;
   the apparatus includes an insulator means, which is effective to hold the two electrodes electrically apart during operation of the apparatus;
   one of the two electrodes, termed the central electrode, is elongate and rod-like in form; the other electrode, termed the sleeve electrode, is hollow-cylindrical, and surrounds the central electrode along its length;
   the apparatus includes a means by which the insulator means and the central electrode are attached firmly and rigidly to each other, and together form a sub-assembly;
   the sleeve electrode is mountable upon, and separable from, the sub-assembly;
   the said means by which the insulator means and the central electrode are attached to each other is such that the central electrode and the insulator means remain attached rigidly together even when the sleeve electrode is separated from the sub-assembly.

the insulator means comprises a plug insulator and a nose insulator;

the said two insulators are separate, and are spaced apart along the length of the central electrode;

and each of the said two insulators is secured firmly and rigidly to the central electrode.

7. Liquid sensing apparatus, wherein:

the apparatus includes two electrodes, and the apparatus is of the kind in which, when the electrodes are in the liquid, the liquid provides a conductive path between the electrodes;

the apparatus includes an insulator means, which is effective to hold the two electrodes electrically apart during operation of the apparatus;

one of the two electrodes, termed the central electrode, is elongate and rod-like in form; the other electrode, termed the sleeve electrode, is hollow-cylindrical, and surrounds the central electrode along its length;

the apparatus includes a means by which the insulator means and the central electrode are attached firmly and rigidly to each other, and together form a sub-assembly;

the sleeve electrode is mountable upon, and separable from, the sub-assembly;

the said means by which the insulator means and the central electrode are attached to each other is such that the central electrode and the insulator means remain attached rigidly together even when the sleeve electrode is separated from the sub-assembly;

the apparatus includes a sleeve lead, which is in electrical contact with the sleeve electrode, and a central lead, which is in electrical contact with the central electrode;

the apparatus is a probe for detecting a level of water in a well, or the like, and the electrical leads form part of a suspension tape which contains graduations for reading off the depth to which the probe has been lowered into the well.

8. Liquid sensing apparatus, wherein:

the apparatus includes two electrodes, and the apparatus is of the kind in which, when the electrodes are in the liquid, the liquid provides a conductive path between the electrodes;

the apparatus includes an insulator means, which is effective to hold the two electrodes electrically apart during operation of the apparatus;

one of the two electrodes, termed the central electrode, is elongate and rod-like in form; the other electrode, termed the sleeve electrode, is hollow-cylindrical, and surrounds the central electrode along its length;

the apparatus includes a means by which the insulator means and the central electrode are attached firmly and rigidly to each other, and together form a sub-assembly;

the sleeve electrode is mountable upon, and separable from, the sub-assembly;

the said means by which the insulator means and the central electrode are attached to each other is such that the central electrode and the insulator means remain attached rigidly together even when the sleeve electrode is separated from the sub-assembly;

the apparatus includes a sleeve lead, which is in electrical contact with the sleeve electrode, and a central lead, which is in electrical contact with the central electrode;

the insulator means includes a through-bore, and the two leads are arranged side by side within the said bore;

the apparatus includes a sealing and suspension means, whereby the leads are sealed within the bore against liquid ingress thereinto, and whereby the leads are mechanically held within the bore;

the sealing and suspension means includes a seal body of heat-shrinkable material, which encircles the two leads, and is shrunk around the two leads;

and the bore includes a pocket, and a means for compressing the said seal body tightly into the said pocket.

9. Apparatus of claim 8, characterized in that the body of heat-shrinkable material is shrunk onto the pair of electrical leads in such a manner that substantially no adhesion or bonding occurs between the body and the leads, whereby the leads can, if the apparatus is abused, be pulled out of the body.

* * * * *